United States Patent [19]

Drouin

[11] 4,215,896
[45] Aug. 5, 1980

[54] BOX FOR A PICK-UP VEHICLE

[76] Inventor: Morris J. Drouin, 643 N. Evergreen Ave., Woodbury, N.J. 08096

[21] Appl. No.: 890,404

[22] Filed: Mar. 27, 1978

[51] Int. Cl.² ............................................. B60R 7/00
[52] U.S. Cl. ................................ 296/24 R; 224/42.42; 296/37.6
[58] Field of Search .................... 296/37.1, 37.6, 24 R, 296/50; 224/29 R, 42.32, 42.33, 42.42 R, 42.03 A, 42.05

[56] References Cited

U.S. PATENT DOCUMENTS

| 413,017 | 10/1889 | Blydenburgh | 296/37.1 |
|---|---|---|---|
| 1,691,804 | 11/1928 | Hanson | 224/42.32 |
| 1,947,745 | 2/1934 | Taylor | 296/37.5 |
| 2,603,527 | 7/1952 | Perkins | 224/42.05 |
| 2,978,153 | 4/1961 | Brindle | 224/42.42 R |
| 3,393,936 | 7/1968 | Hall | 296/24 R |
| 3,731,860 | 5/1973 | Davis | 224/42.03 A |
| 3,940,009 | 2/1976 | Szeles | 296/37.6 |

FOREIGN PATENT DOCUMENTS 1137741 10/1955 France ..................................... 296/37.1

Primary Examiner—John J. Love
Assistant Examiner—John A. Carroll
Attorney, Agent, or Firm—Paul & Paul

[57] ABSTRACT

A container with an open rear side is attached to the rear portion of the bed of a pick-up vehicle, usually a truck, so that the tail-gate of the vehicle forms a closure of the container when the tail-gate is raised above the horizontal. In a preferred embodiment, the top of the container slopes forward toward the front of the vehicle so that an object placed on the top will slide forward onto the bed of the pick-up vehicle; and a rear extension of the top of the container slopes downward to protect the interior of the box and its contents from rain, snow and other elements. This container can hold tools, spare parts and vehicle accessories, as well as objects that are used in a trade or business.

8 Claims, 4 Drawing Figures

BOX FOR A PICK-UP VEHICLE

BACKGROUND OF THE INVENTION

In the art related to a container that is carried on the bed of a pick-up vehicle, the container either has a door which opens upward, exposing the container contents to possible bad weather elements or the container extends outward from the truck, also possibly exposing the contents to rain, snow and other elements. In all instances, access to the container has been relatively slow and awkward, especially when access to the container is through its top.

PRIOR ART STATEMENT

A search in the Patent Office, directed to class 224, subclass 42.42 and class 296, subclasses 24 and 37.6, which pertain to the field of this invention has produced the following U.S. patents which, in applicant's opinion, are the closest prior art to this invention: U.S. Pat. No. 584,167; 2,722,352; 2,784,027; 2,867,471; 3,068,038; 3,326,595; 3,664,704; 3,826,529; 3,940,009. Copies of these patents are attached here. A review of these patents does not disclose my invention.

SUMMARY OF THE INVENTION

The present invention is directed to a box which is formed when a container with a closed top, closed sides, a closed back, a closed base (when preferred), and an open rear side, is placed on the rear portion of the bed of a pick-up vehicle, usually a truck, so that the tail-gate of the vehicle becomes a closure member of this container when the tail-gate is raised to a closed position.

Because this container is open at the back when the tail-gate is down, it provides quick, easy insertion and removal at arm level of any objects that are intended to be kept in the container. The use of the tail-gate as the back door of this container removes the need for opening and closing more than one door while storing objects.

This container can have a top that slopes forward, toward the front of the pick-up vehicle so that any object that is too large to be stored in the container, can be placed on the top so that it can slide or be pushed to the bed of the pick-up vehicle between the container and the vehicle cab. The top can be rigid and reinforced to withstand the weight of heavy objects that will be placed on it. The container and its sloping top will keep the object from falling out of the vehicle.

The container top can have an extension, sloping downward, from the back of the top, to deflect rain, snow and other elements from the interior of the container and its contents.

This container should preferably be as wide as the width of the bed of the vehicle, and should preferably be attached to that vehicle bed, so that the container will remain where positioned. The container can have within it, one or more compartments, for holding and separating one or more smaller objects.

It is, accordingly, an object of this invention to provide a container for quick, easy access for inserting and removing objects at arm level when this container is positioned on the rear portion of the bed of a pick-up vehicle.

It is another object of this invention to provide a container whose top slopes forward so that when the container is positioned on the rear position of the bed of a pick-up vehicle, any object that is placed on the sloping top of the container will slide forward onto the bed of the vehicle and remain there while the vehicle is moving, until the object is removed.

Other objects and advantages of the present invention will be readily apparent to those skilled in the art by reading the following brief descriptions of the drawing figures, detailed description of a preferred embodiment, and the appended claims.

BRIEF DESCRIPTION OF THE DRAWING FIGURES

DETAILED DESCRIPTION OF THE PREFERRED EMBODIMENT

Figure 1:
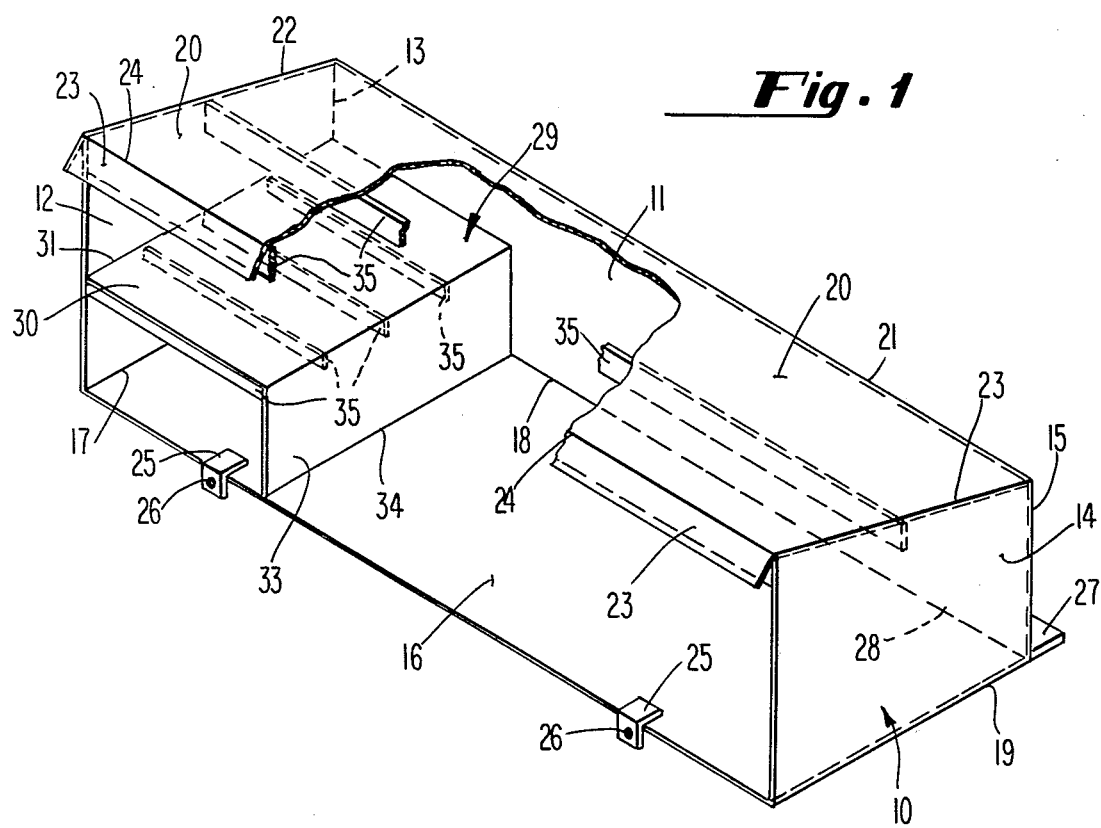
FIG. 1 is a isometric view, with the top partially broken away, of a preferred embodiment of the container of the invention.
Figure 2:
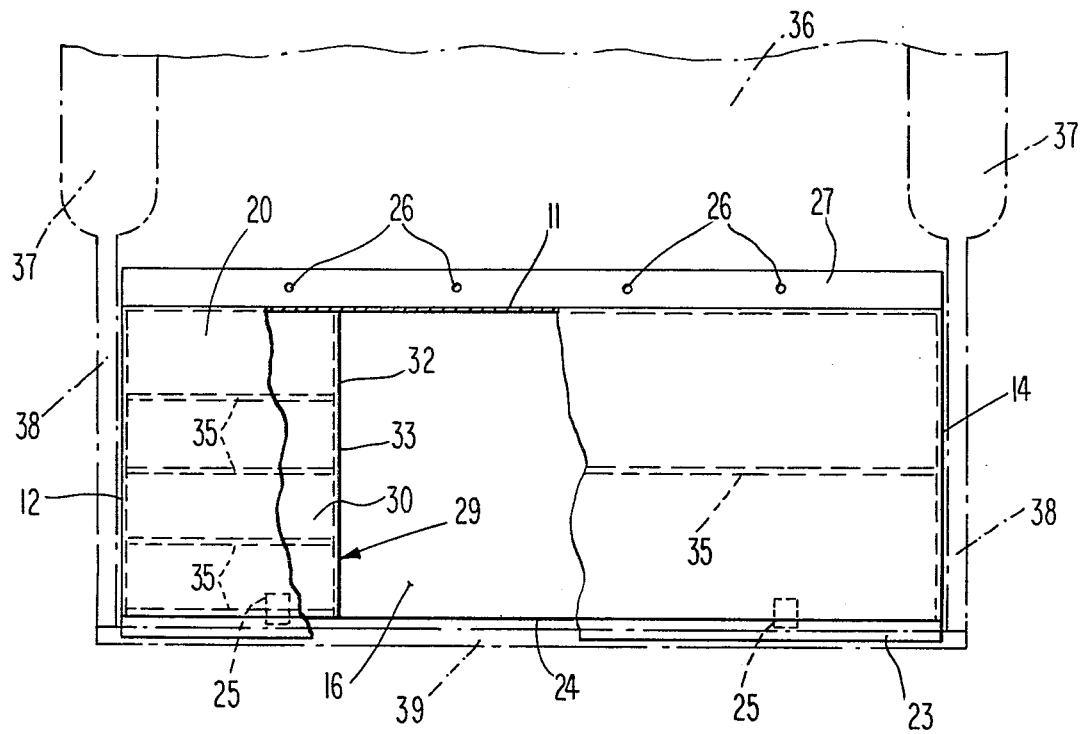
FIG. 2 is a top view, with the top partially broken away, of a preferred embodiment of the invention, showing the container positioned on the rear portion of the bed of a pick-up, shown in phantom, with a vertically closed tail-gate, shown in phantom.

Reference is now made to FIG. 1 which is an isometric view, with the top partially broken away, of the preferred embodiment of the container 10 of the invention. The container 10 can be made of metal, plastic, wood or other suitable material. The container 10 is formed by the permanent joinder of an unbroken, flat front sheet 11 with an unbroken, flat left side sheet 12 at the linear juncture 13, and with an unbroken flat right side sheet 14 at the linear juncture 15. A flat, unbroken base sheet 16 is then permanently joined to the left flat side sheet 12 at the linear juncture 17 and permanently joined to the front flat side sheet 11 at the juncture 18, and permanently joined to the right flat side sheet 14 at the linear juncture 19. The flat top sheet 20 of the container slopes downward toward the flat front sheet 11, to which the flat top sheet 20 is permanently affixed at the linear juncture 21. The flat top sheet 20 is permanently affixed to the left flat side sheet 12 at the linear juncture 22 and to right flat side sheet 14 at the linear juncture 23. The top sheet 20 of the container has a top sheet extension 23 which extends backward and downward from top sheet 20 and is permanently affixed at linear juncture 24 to the top sheet 20. Two identical back flanges 25, each having a hole 26 through which a bolt or other suitable fastener can be inserted to join the flanges 25 to the bed of the vehicle (not shown of FIG. 1), are permanently affixed to the container 10. A front flange 27 is permanently attached to the container at the linear juncture 28 and extends forward from the container in the same horizontal plane as the flat base sheet 16. A compartment 29 is formed within the container 10 by the bonded joinder of a rigid flat horizontal panel 30 with the flat left side sheet 12 at the linear juncture 31 and then by the bonded joinder at linear juncture 32 with a rigid flat vertical panel 33, which is itself permanently affixed by bonded joinder to the flat sheet base 16 at the linear juncture 34. Rigid reinforcing bars 35 are permanently bonded to the underside of the rigid horizontal panel 30 and also to the underside of the flat top 20. Referring to FIG. 2 which is a top view, the container top 20 referred to in FIG. 1, is partially broken away, to show the flat unbroken base sheet 16, and the rigid flat horizontal panel 30 and its linear juncture 32 with the rigid flat vertical panel 33, shown here from above as a line and a dotted line. The flat sheet 11 is shown from above as broken and shaded. The bed 36, the wheel wells 37, the side walls 38 and the closed vertical tail-gate 39 are all shown in phantom. A front flange 27 is shown from above with four holes 26, through which bolts or other suitable fasteners can be inserted to join the front flange 27 to the bed 36 of a pick-up vehicle, partly shown in phantom. Reinforcing bars 35 are permanently bonded to the underside of the rigid horizontal panel 30 and the underside of the flat top sheet 20.

The two rear flanges 25 that are premanently affixed to the flat base sheet 16, are shown. The flat top sheet 20 has a flat sheet extension 23 which extends downward and backward from and permanently affixed to the top sheet 20 at the linear juncture 24.

Figure 3:
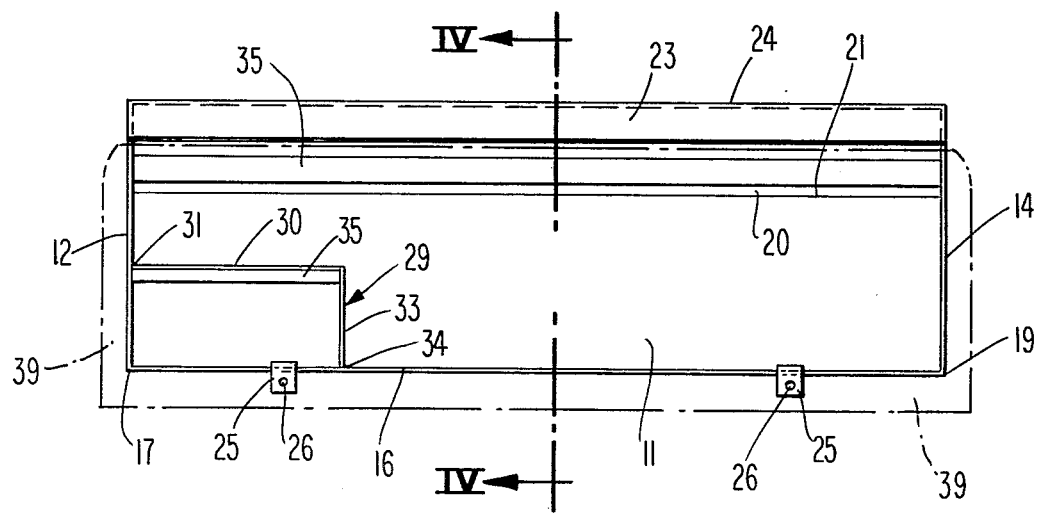
FIG. 3 is an elevation view of the back side of a preferred embodiment of the container, of the invention, viewing the container from behind a vehicle, with the vertically closed tail-gate of the vehicle shown in phantom.

FIG. 3 is an elevation view of the back side of a preferred embodiment of the container 10 of the invention, viewing the container 10 from behind a vehicle, not shown in FIG. 3, with the vertically closed tail-gate 39 of the vehicle shown in phantom. FIG. 3 shows the left side sheet 12 which is joined at juncture 17, to the base sheet 16, which is joined to the right side sheet 14 at juncture 19. Also shown is the front sheet 11, which is attached to the top 20 at linear juncture 21. Also shown is the top sheet extension 23 which extends downward from the top sheet 20 to which it is permanently affixed at linear juncture 24. Also shown are two identical back flanges 25, each having a hole 26 through which a bolt or other suitable fastener can be inserted through the flanges 25 to join the flanges 25 to the bed of the vehicle (not shown on FIG. 3, except for the tail-gate 39, in phantom). A smaller container 29 is formed by the bonding of horizontal panel 30, at juncture 31, with left side sheet 12, and at juncture 32, with vertical panel 33, which is joined to the flat base 16 at juncture 34. Reinforcing bars 35 are permanently bonded to the underside of the rigid horizontal panel 30 and the underside of the top sheet 20.

Figure 4:
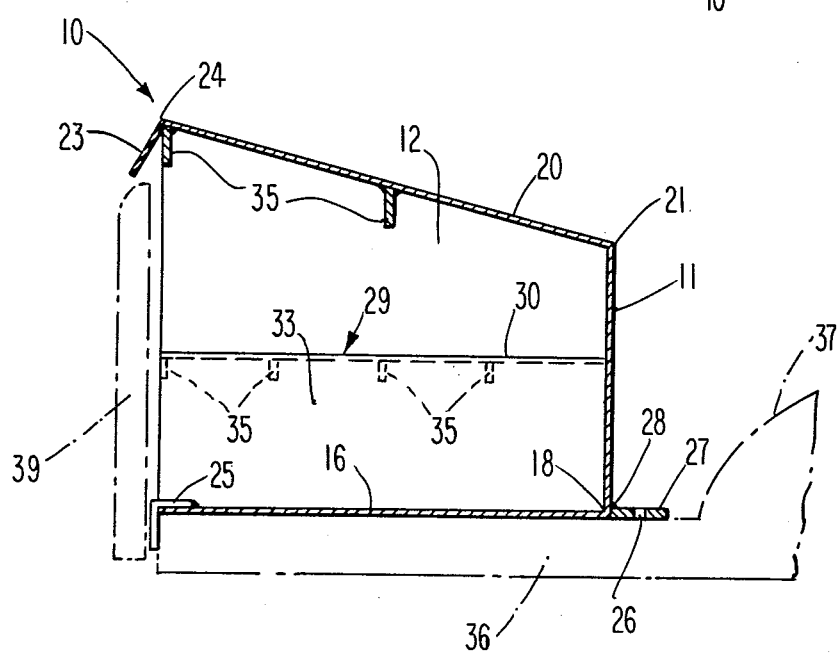
FIG. 4 is a vertical sectional view taken along the line IV—IV of FIG. 3.

FIG. 4 is a vertical sectional view taken along the line IV—IV of FIG. 3. FIG. 4 shows flat front sheet 11, which is permanently joined at juncture 21 to top sheet 20 and at juncture 18, to flat base sheet 16, to which back flange 25 is permanently affixed. Top sheet extension 23 slopes downward at a 30° angle from the vertical, to protect the interior of container 10 from snow, rain and other elements. A front flange 27 is permanently attached to container 10 at juncture 28 and extends forward from the container 10 in the same horizontal plane as flat base sheet 16. Front flange 27 has holes 26, through which a bolt or other suitable fastener can be inserted to join front flange 27 to the bed 36 of a pick-up vehicle, shown in phantom. A rigid reinforcing bar 35 is permanently attached to the underside of top 20. A compartment 29 is formed with container 10 by a rigid horizontal panel 30, being permanently joined to left side sheet 12 and to a rigid vertical panel, not shown in FIG. 4. The rigid horizontal panel 30 is strengthened by four reinforcing bars, which are permanently joined to the underside of the rigid horizontal panel 30. The tail-gate 39, shown in phantom in FIG. 4 in a vertical position forms a closure for container 10. It will be understood that various modifications may be made in the details of construction and in the use and functions of the invention.

What is claimed is:

1. A box in combination with a pick-up vehicle comprising:
    container having two closed sides, a closed front, a closed top, an open rear side, means for attaching said container to the rear portion of the bed of said pick-up vehicle so that the tail-gate of said pick-up vehicle forms a closure of said rear side of said container when said tail-gate is raised to a vertical position, and said closed top slopes down and forward toward the front of said pick-up vehicle, so that any object placed on said top will slide forward toward said front of said pick-up vehicle.

2. A box in combination with a pick-up vehicle comprising:
    container having two closed sides, a closed front, a closed top and an open rear side, means for attaching said container to the rear portion of the bed of said pick-up vehicle so that a tail-gate of said pick-up vehicle forms a closure of said rear side of said container when said tail-gate is raised to a vertical position, and said closed top has an extension of said top that slopes down and extends backward from the back of said container.

3. A box in combination with a pick-up vehicle as in claim 2, wherein said container has a closed base and wherein said attaching means comprise at least one front flange which extends forward from said base in a plane coextensive with said base and at least one rear flange which extends rearward from said base in a plane parallel to said coextensive base plane, and means for securing said flanges to said pick-up vehicle.

4. A box in combination with a pick-up vehicle as in claim 2 wherein said pick-up vehicle is a pick-up truck.

5. A box in combination with a pick-up vehicle as in claim 2 wherein said container further comprises at least one compartment within said container.

6. A box in combination with a pick-up vehicle as in claim 5 wherein said compartment is formed by a rigid horizontal panel which extends from one side of said container to a vertical rigid panel which is attached to said base.

7. A box in combination with a pick-up truck comprising:
    container having two closed sides, a closed front, a closed top, a closed base, an open rear side, and means for attaching said container to the rear portion of the bed of said truck, a tail-gate of said truck forms a closure of said rear side of said container when said tail-gate is in a vertical position, said closed top slopes down and forward toward the front of said truck, said closed top has an extension that extends backward and downward from said container, said attaching means comprise at least one front flange which extends from said closed base in a plane coextensive with said closed base and at least one back flange which extends backward from said closed base in a plane parallel to said closed base plane, means for securing said flanges to said truck, said container further comprises, a compartment, which is formed by a rigid horizontal panel which extends from one said closed side of said container to a vertical rigid panel, attached to said closed base, and said compartment has a rigid reinforcing bar, attached to the underside of said rigid horizontal panel.

8. A box which is specially designed for use with a pick-up truck comprising:

container having two closed sides, a closed front, a closed top, a closed base, an open rear side, and means for attaching said container to the rear portion of the bed of said truck, a tail-gate of said truck forms a closure of said rear side of said container when said tail-gate is in a vertical position, said closed top slopes down and forward toward the front of said truck, said closed top has an extension that extends backward and downward from said container, said attaching means comprise at least one front flange which extends forward from said closed base in a plane coextensive with said closed base in a plane parallel to said closed base plane, means for securing said flanges to said truck, said container further comprises, a compartment which is formed by a rigid horizontal panel which extends from one said closed side of said container to a vertical rigid panel, attached to said closed base, and said compartment has a rigid reinforcing bar, attached to the underside of said rigid horizontal panel.

* * * * *